(12) United States Patent
Nakata (10) Patent No.: US 7,256,977 B2
(45) Date of Patent: Aug. 14, 2007

(54) DEVICE FOR PROTECTION FROM THUNDER

(75) Inventor: Ryosaku Nakata, Aichi (JP)

(73) Assignee: Nippon Kouatsu Electric Co., Ltd., Aichi (JP)

( * ) Notice: Subject to any disclaimer, the term of this patent is extended or adjusted under 35 U.S.C. 154(b) by 0 days.

(21) Appl. No.: 10/538,080

(22) PCT Filed: Nov. 14, 2003

(86) PCT No.: PCT/JP03/14546

§ 371 (c)(1),
(2), (4) Date: Oct. 25, 2005

(87) PCT Pub. No.: WO2004/054062

PCT Pub. Date: Jun. 24, 2004

(65) Prior Publication Data

US 2006/0139835 A1    Jun. 29, 2006

(30) Foreign Application Priority Data

| Dec. 10, 2002 | (JP) | 2002-358018 |
| Jun. 6, 2003 | (JP) | 2003-162756 |
| Jun. 12, 2003 | (JP) | 2003-167517 |

(51) Int. Cl.
H02H 1/04 (2006.01)
H02H 9/00 (2006.01)

(52) U.S. Cl. .................. 361/117; 361/58

(58) Field of Classification Search ........ 361/117, 361/58

See application file for complete search history.

(56) References Cited

U.S. PATENT DOCUMENTS

| 3,601,618 A | * | 8/1971 | Toyonaka et al. | 307/9.1 |
| 4,276,576 A | * | 6/1981 | Uman et al. | 361/1 |
| 5,521,603 A | * | 5/1996 | Young | 342/198 |
| 5,721,659 A | * | 2/1998 | Young | 361/111 |
| 6,011,682 A | * | 1/2000 | Storey | 361/117 |
| 6,104,583 A | * | 8/2000 | Wynn et al. | 361/7 |

FOREIGN PATENT DOCUMENTS

| JP | 3-086017 | | 4/1991 |
| JP | 5-326108 | | 12/1993 |
| JP | 07-298476 | | 11/1995 |
| JP | 9-331627 | * | 12/1997 |
| JP | 2000-76984 | | 3/2000 |

* cited by examiner

Primary Examiner—Stephen W. Jackson
Assistant Examiner—Scott Bauer
(74) Attorney, Agent, or Firm—Morgan, Lewis & Bockius LLP (57) ABSTRACT

This invention aims at preventing a thunderbolt attack detecting circuit from determining that no thunderbolt is approaching because the thunderbolt attack detecting circuit turns to its initial condition due to power interruption caused by an approaching thunderbolt and is changed over into a normal condition in the thunderbolt approaching status maintained. This thunderbolt disaster protecting apparatus includes a thunderbolt attack detecting circuit for determining whether or not any thunderbolt is approaching by detecting a thunderbolt signal and a switching mechanism for changing over to the normal condition in which a protection object device is connected to an electrical path or to thunderbolt resisting condition in which the protection object device is separated from the electric path.

3 Claims, 4 Drawing Sheets

DEVICE FOR PROTECTION FROM THUNDER

This application is filed under 35 U.S.C. 371 from International Application PCT/JP03/014546, with an international filing date of Nov. 14, 2003, which claims the benefit of priority to Japanese Application No. 2002-358018, filed Dec. 10, 2002, Japanese Application No. 2003-162756, filed Jun. 6, 2003, and Japanese Application No. 2003-167517, filed Jun. 12, 2003, which are incorporated by reference in their entirety.

TECHNICAL FIELD

The present invention relates to a thunderbolt disaster protecting apparatus for protecting an electronic apparatus from being damaged by a lightning surge generated by a thunderbolt, which enters from commercial frequency power lines. More particularly, the present invention relates to a thunderbolt disaster protecting apparatus which minimizes power loss accompanied by protecting from a thunderbolt.

TECHNICAL FIELD

Usually; the commercial frequency power path is distributed to buildings of homes and the like after the voltage of a high voltage line is dropped to 100 V with a pole transformer, supplying electric power to electric appliances such as refrigerator, washing device, air conditioner and other electric appliances connect to an electric path and such as TV, telephone, facsimile, personal computer to communication line.

As regards the electric path and communication line, it has been well known that lightning surge is generated due to a thunderbolt on a high voltage line and that surge is propagated through the electric path and invades into the buildings thereby damaging electric appliances connected to these lines. To protect these electric appliances, a thunderbolt disaster protecting apparatus for shutting down supply of power while indicating an alarm of thunderbolt by detecting an abnormal voltage caused by lightning surge and then transmitting a control signal has been proposed {see, for example, Japanese Patent Application Laid-Open No. HEI5-326108 (pages 2, 3, FIG. 1)}. Further, a thunderbolt disaster protecting apparatus in which a thunderbolt resistant transformer is inserted into a power line in order to prevent the lightning surge from reaching any electric appliance has been also proposed (see, for example, Japanese Patent Application Laid-Open No. HEI03-086017).

However, a circuit for detecting an attack of thunderbolt obtains its power supply from a household line. However, because the apparatus returns to its initial state due to power interruption if the household line is interrupted by the thunderbolt, there is such a problem that when the control power supply is restored again, it is in a state in which no thunderbolt is approaching due to the initialization even if another thunderbolt is approaching.

Further, if power interruption occurs with the thunderbolt approaching status maintained, there is another problem that even if no thunderbolt approaches after the power supply is restored, the thunderbolt approaching state is maintained.

Although as a countermeasure which should be taken when the control power supply is interrupted, it can be considered to provide with a backup power supply circuit for memorizing whether the thunderbolt is approaching using a battery or the like, in this case, there is another problem that the maintenance of the backup power supply is needed.

Further, because in the thunderbolt disaster protecting apparatus used in the thunderbolt resisting transformer, its power loss due to iron loss of the thunderbolt resisting transformer is as large as 3-10% its transformer capacity, a thunderbolt resisting means whose power loss is smaller has been demanded.

DISCLOSURE OF THE INVENTION

The present invention is disclosed as follows.

A thunderbolt disaster protecting apparatus comprising a thunderbolt attack detecting circuit for determining whether or not any thunderbolt is approaching by detecting a thunderbolt signal; and a switching mechanism for changing over to a normal condition in which a protection object device is connected to an electric path or a thunderbolt resisting condition in which the protection object device is separated from the electric path, wherein the thunderbolt attack detecting circuit and the switching mechanism obtain a control power from the electric path and the thunderbolt attack detecting circuit changes over the switching mechanism to the normal condition at the time of normal condition and when any thunderbolt is approaching, changes over the switching mechanism to the thunderbolt resisting condition.

The thunderbolt attack detecting circuit further comprises a power interruption restoration circuit which after the control power supply is interrupted and then the power interruption is restored, determines whether or not any thunderbolt is approaching in a predetermined time interval and changes over the switching mechanism to the thunderbolt resisting condition if a thunderbolt is approaching and to the normal condition if the condition is normal.

A thunderbolt disaster protecting apparatus comprising a thunderbolt resisting transformer, a thunderbolt attack detecting circuit for determining whether or not any thunderbolt is approaching by detecting a thunderbolt signal, and a switching mechanism for changing over to the normal condition in which a protection object device is connected to an electric path or to the thunderbolt resisting condition in which the protection object device is connected to the electric path through the thunderbolt resisting transformer, wherein the thunderbolt attack detecting circuit and the switching mechanism obtain a control power from the electric path and the thunderbolt attack detecting circuit changes over the switching mechanism to the normal condition at the time of normal condition and when any thunderbolt is approaching, changes over the switching mechanism to the thunderbolt resisting condition.

The thunderbolt attack detecting circuit further comprises a power interruption restoration circuit which after the control power supply is interrupted and then the power interruption is restored, determines whether or not any thunderbolt is approaching in a predetermined time interval and changes over the switching mechanism to the thunderbolt resisting condition if a thunderbolt is approaching and to the normal condition if the condition is normal.

EFFECT OF THE INVENTION

Because according to the thunderbolt attack protecting apparatus of the first invention, only in a period in which a device needs to be protected from lightning surge due to falling of thunderbolt, the electric path is shut down and if the forerunning phenomenon of the lightning surge diminishes, the electric path is connected again, it can protect the device when any thunderbolt is approaching and when the condition returns to normal one, it can be automatically restored.

When supply of electricity from a control power supply of the thunderbolt disaster protecting apparatus is stopped by power interruption due to falling of thunderbolt or the like, even if a backup power supply for securing the operation at the time of the power interruption is not provided, the thunderbolt attack detecting circuit turns into initial condition because of the power interruption when the thunderbolt is approaching. As a result, it is possible to prevent easily the thunderbolt attack detecting circuit form determining that no thunderbolt is approaching and then changing over to the normal condition, so that any thunderbolt disaster on a protection object device due to the power interruption can be prevented.

When power interruption occurs in the thunderbolt resisting condition and no thunderbolt is approaching after the power supply is restored, the thunderbolt attack detecting circuit turns into the initial condition due to the power interruption, so that it is possible to prevent a case in which it is determined that no thunderbolt is approaching and thus no signal is sent to the operation control means, maintaining the thunderbolt resisting condition.

Further, by determining whether or not any thunderbolt is approaching in a predetermined time interval after power is restored, it is possible to recognize whether or not the thunderbolt is approaching just after the power is restored. As a result, misjudgment due to initialization of the thunderbolt disaster protecting apparatus can be prevented so as to protect the protection object apparatus from a damage by the thunderbolt.

According to the thunderbolt attack protecting apparatus of the third invention, by using the thunderbolt resisting transformer, lightning surge invading from the power supply side is prevented from being propagated to the load side by means of the thunderbolt resisting transformer in addition to the above-described effect, so that the protection object device can be protected from thunderbolt disaster with the protection object device being supplied with electricity, without interrupting power to the protection object device even in the thunderbolt resisting condition. At the same time, power consumption due to iron loss in the thunderbolt resisting transformer at the normal time can be eliminated.

Further a relatively small thunderbolt resisting transformer can be used because the apparatus does not need to be activated except in a short time when any thunderbolt is approaching.

BEST MODE FOR CARRYING OUT THE INVENTION

Hereinafter, the thunderbolt disaster protecting apparatus of the present invention will be described with reference to FIGS. 1-5.

1. EMBODIMENT 1

The first embodiment concerns a thunderbolt disaster protecting apparatus which is connected to a low voltage power line and interrupts a load from the household electric line only during a period in which the thunderbolt is approaching, so that no trouble occurs in restoration even if power interruption happens.

(1) Structure of the Thunderbolt Disaster Protecting Apparatus

Figure 1:
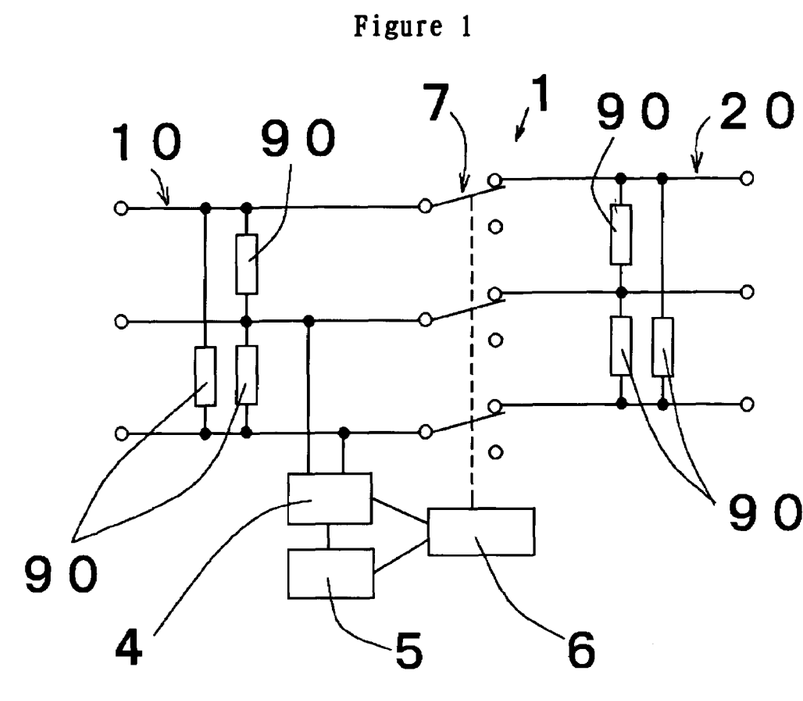
FIG. 1 is an explanatory diagram showing a normal condition of the first embodiment of the present invention.

The thunderbolt disaster protecting apparatus of the first embodiment is inserted in between an electric path 10 connected to a lead-in wire or the like introduced from outdoor into a house and a load side electric path 20 connected to the power supply of a protection object device.

The thunderbolt disaster protecting apparatus 1 comprises a power supply circuit 4, a thunderbolt attack detecting circuit 5, an operation control means 6 and a status change-over switch 7. Further, in the path 10 and the load side path 20, lightning arresting devices 90 each composed of an arrestor and a surge absorbing device are connected so as to cross over the respective phases.

A power supply circuit 4 is connected to the electric path 10 and supplies electricity obtained from the electric path 10 to the thunderbolt attack detecting circuit 5 and the operation control means 6.

The thunderbolt attack detecting circuit 5 is a circuit for detecting a thunderbolt to determine whether it is approaching and give an instruction for an operation corresponding to its result to the operation control means. In the thunderbolt attack detecting circuit 5, arbitrary detecting means is used single or in plural quantities in combination so as to determine whether or not a thunderbolt is approaching. By combining plural detection signals upon determination, it is possible to prevent misjudgment.

As a means used for determining whether the thunderbolt is approaching, lightning surge propagated through lightning, thunder, electric wave, electric field and electric path can be exemplified. For example, if the determination is made using lightning and thunder, when the light amount and sound level exceed a predetermined value or a difference in detection time of lightning and thunder having the light amount and sound level exceeding the predetermined value drops below a predetermined value, it can be determined that the thunderbolt is approaching. Further, when the lightning surge exceeds a predetermined voltage value or current value or when the occurrence frequency of lightning surge over the predetermined value exceeds a predetermined value, determining that the thunderbolt is approaching can be exemplified. Further, in case of detection by measuring electrostatic field, determining that the thunderbolt occurs when a predetermined strength is exceeded and that value drop rapidly can be exemplified.

If the thunderbolt attack detecting circuit 5 determines that the thunderbolt is approaching, it sends a change-over signal for thunderbolt resisting condition to the operation control means 6. If the condition which satisfies the thunderbolt approaching condition disappears or the condition which satisfies the thunderbolt approaching condition while a predetermined time has elapsed, it regards that the thunderbolt approaching condition is released and sends a change-over signal for the normal condition to the operation control means 6.

Further, the thunderbolt attack detecting circuit 5 is provided with a power interruption restoration circuit which after the control power supply is interrupted and then the power interruption is restored, determines whether or not the thunderbolt is approaching for a predetermined time and instructs the operation control means 6 to change over to the thunderbolt resisting condition when any thunderbolt is approaching or to the normal condition when it is in normal condition.

In the meantime, the thunderbolt attack detecting circuit 5 can continue to send a change-over signal for the thunderbolt resisting condition to the operation control means 6 during a condition in which the thunderbolt is approaching and can determine that it is in the normal condition when no change-over signal for the thunderbolt resisting condition is sent.

The predetermined time is permitted to be selected arbitrarily as long as it is over an interval of the thunderbolt and can be of arbitrary duration over an ordinary thunderbolt interval of about 40 m seconds. Although as this example, 50 m seconds, 100 m seconds, 1 second, 10 seconds, 1 minute, 30 minutes and 1 hour and the like can be mentioned, but this is not restricted to any particular one.

The operation control means 6 and the status change-over switch 7 are switching mechanism. The operation control means 6 is a switching mechanism for controlling the change-over operation on a contact point of the status change-over switch 7 from the normal condition shown in FIG. 1 to the thunderbolt resisting condition shown in FIG. 2 according to a signal of the thunderbolt approaching status from the thunderbolt attack detecting circuit 5. This actuates drive sections such as a motor and magnet and the like of the status change-over switch 7 described later, to automatically operate the status change-over switch 7 so that it connects a protection object device to the electric path 10 when it is in the normal condition and it shuts down the protection object device from the electric path 10 when it is in the thunderbolt resisting condition.

Figure 2:
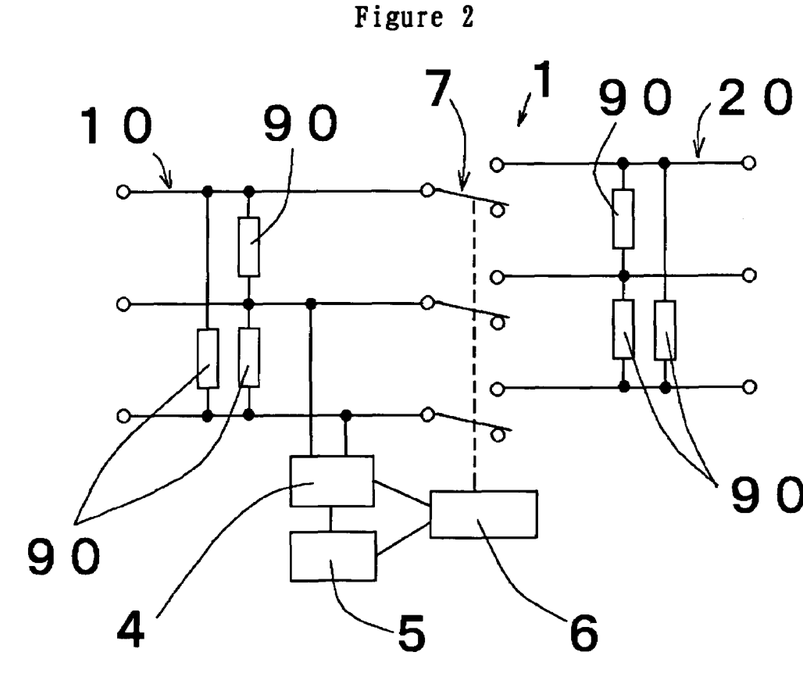
FIG. 2 is an explanatory diagram showing the thunderbolt resisting condition of the first embodiment of the present invention.

When the thunderbolt approaching status is released, a signal for releasing the thunderbolt approaching status is sent from the thunderbolt attack detecting circuit 5 to the operation control means 6 so that the status change-over switch 7 is changed over from the thunderbolt resisting condition shown in FIG. 2 to the normal condition shown in FIG. 1. The operation control means 6 keeps its previous condition until a signal is sent from the thunderbolt attack detecting circuit 5.

The status change-over switch 7 is composed of a mechanical contact switch which changes over a protection object device (not shown) connected to the load side electric path 20 between the normal condition in which it is connected to the electric path 10 and the thunderbolt resisting status in which the protection object device is separated from the electric path 10. This is, for example, an automatic switch which is actuated by a drive section such as a motor, magnet and such electromagnetic contact device as a ratchet relay, keep relay and circuit breaker can be exemplified. By using these, a current normal condition or thunderbolt resisting condition can be maintained mechanically even in non-voltage condition.

The status change-over switch 7 has voltage withstanding capacity of about 30 kV capable of withstanding an excessive voltage of lightning surge in order to prevent lightning surge from being propagated to a separated load side electric path 20 when the power supply is shut down.

Further, the status change-over switch is permitted to be of any type of switch such as mechanical contact point, semiconductor type, as long as it can be controlled by the operation control means.

(2) Operation of the Thunderbolt Disaster Protecting Apparatus

[1] Normal Condition

In a normal condition in which no thunderbolt approaches, the status change-over switch 7 is changed over to the normal side in which a protection object device connected to the load side electric path 20 is connected to the electric path 10.

Detection of arrival of the thunderbolt by the thunderbolt attack detecting circuit 5 is carried out continuously.

[2] Thunderbolt Resisting Condition

If the thunderbolt approaches, lightning surge is detected by the thunderbolt attack detecting circuit 5 and the status change-over switch 7 is changed over to the separation side. Consequently, a load is separated from the electric path 10 and protected from lightning surge.

When a predetermined time elapses after a last lightning surge is detected, it is returned to the normal condition.

[3] Power Interruption and Power Interruption Restoration Condition

If power interruption occurs for a reason, for example, falling of thunderbolt so that no electric power necessary for operating the thunderbolt disaster protecting apparatus can be obtained, the status change-over switch 7 maintains a status before the power interruption. Thus, even if a power interruption occurs in the thunderbolt resisting condition, the load can be kept to be isolated from the electric path 10 and thus, if lightning surge occurs after the power interruption, it can be protected.

Further, when the status is restored from the power interruption, the thunderbolt attack detecting circuit 5 detects presence or absence of lightning surge and if it is not detected, the status change-over switch 7 is changed over to the normal condition and if it is detected, to the thunderbolt resisting condition. If there is any given status, that status is maintained.

2. SECOND EMBODIMENT

The second embodiment concerns a thunderbolt disaster protecting apparatus, which is connected to a low voltage power line and in which a thunderbolt resisting transformer is interposed between the electric path and load. When the thunderbolt approaches, thereby when power interruption occurs, no obstacle is produced in its restoration of power.

(1) Structure of Thunderbolt Disaster Protecting Apparatus

Figure 3:
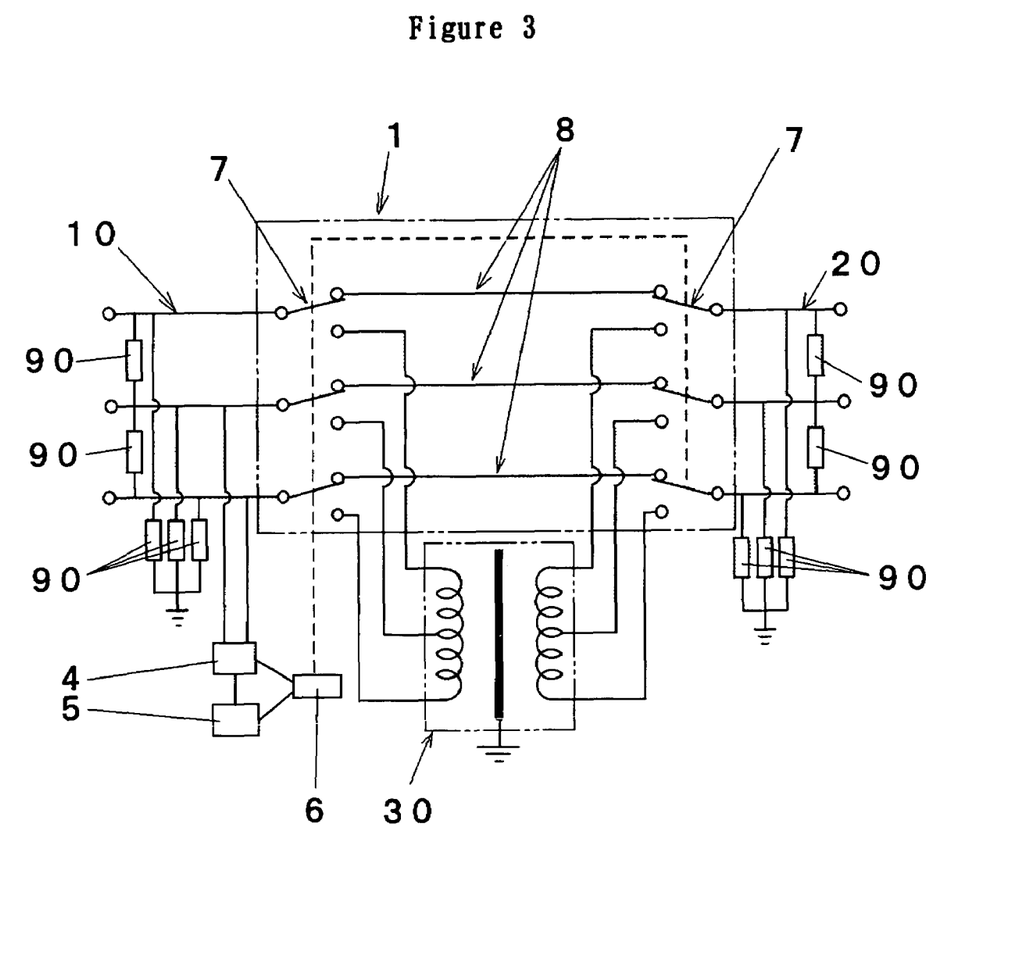
FIG. 3 is an explanatory diagram showing the normal condition of the second embodiment of the present invention.
Figure 4:
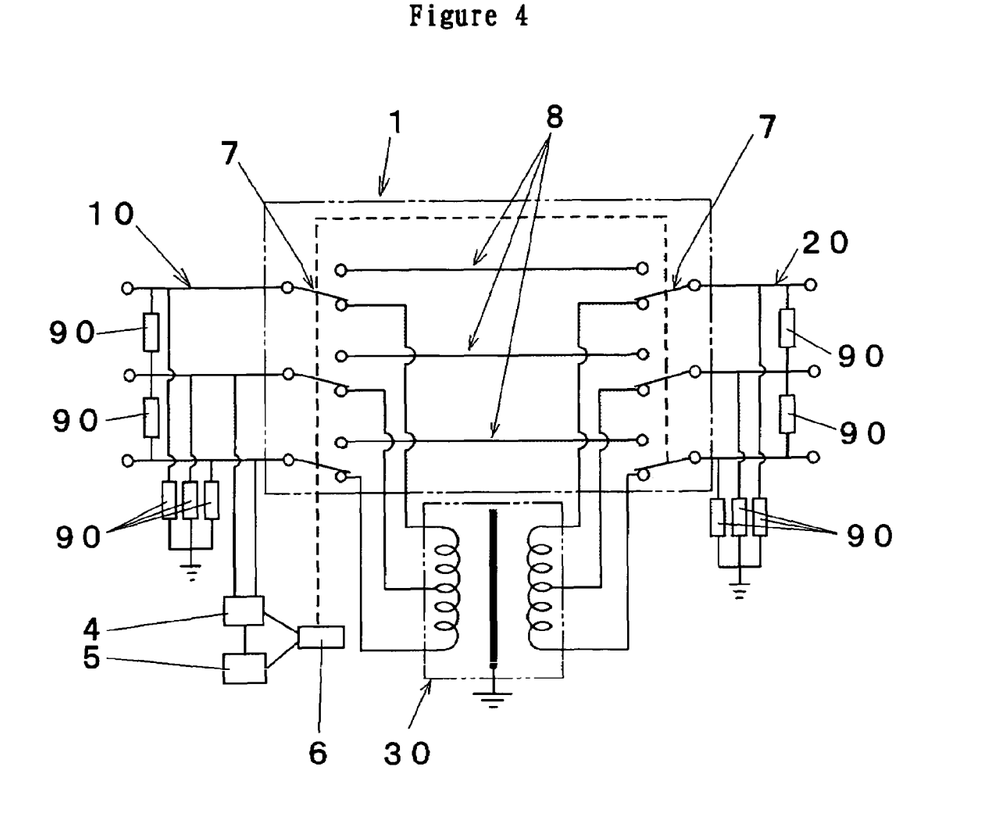
FIG. 4 is an explanatory diagram showing the thunderbolt resisting condition of the second embodiment of the present invention.

In the thunderbolt disaster protecting apparatus of the second embodiment, as shown in FIGS. 3, 4, in the normal condition, the thunderbolt resisting transformer 30 is separated from the electric path and electricity is supplied to a protection object device (not shown) connected to the load side electric path 20 through bypass lines 8 from the electric path 10.

The thunderbolt disaster protecting apparatus 1 comprises a power supply circuit 4, a thunderbolt attack detecting circuit 5, an operation control means 6 and a status change-over switch 7. Lightning arresting devices 90 comprising an arrestor, a surge absorbing device and the like are connected to the electric path 10 and the load side electric path 20 such that they cross over the respective phases.

FIG. 4 is an explanatory diagram of the thunderbolt resisting condition when the thunderbolt resisting condition is changed over. When the thunderbolt attack detecting circuit 5 determines that the thunderbolt is approaching, the operation control means 6 changes over the status change-over switch 7 to the thunderbolt resisting condition and electricity is supplied to a protection object device (not shown) connected to the load side electric path 20 in conditions in which the thunderbolt resisting transformer 30 is inserted in between the electric path 10 and the load side electric path 20.

Using the thunderbolt resisting transformer 30 enables blocking a lightning surge invading from the power supply side from being propagated to the load side by means of the thunderbolt resisting transformer 30. Even when the thunderbolt resisting status is maintained, electricity is supplied to the protection object device without interruption power to the protection object device.

Particularly because by using an automatic switch or the like which is actuated by a magnet, the change-over time of the status change-over switch 7 is set to less than 10 m seconds so that the protection object device can be changed over in substantially no power interruption condition, the protection object device can be protected from power interruption at the time of the change-over. Further, because at the time of the normal condition, the thunderbolt resisting transformer 30 can be separated from the electric path, there is an effect of eliminating power consumption by non-load loss such as iron loss of the thunderbolt resisting transformer 30.

Figure 5:
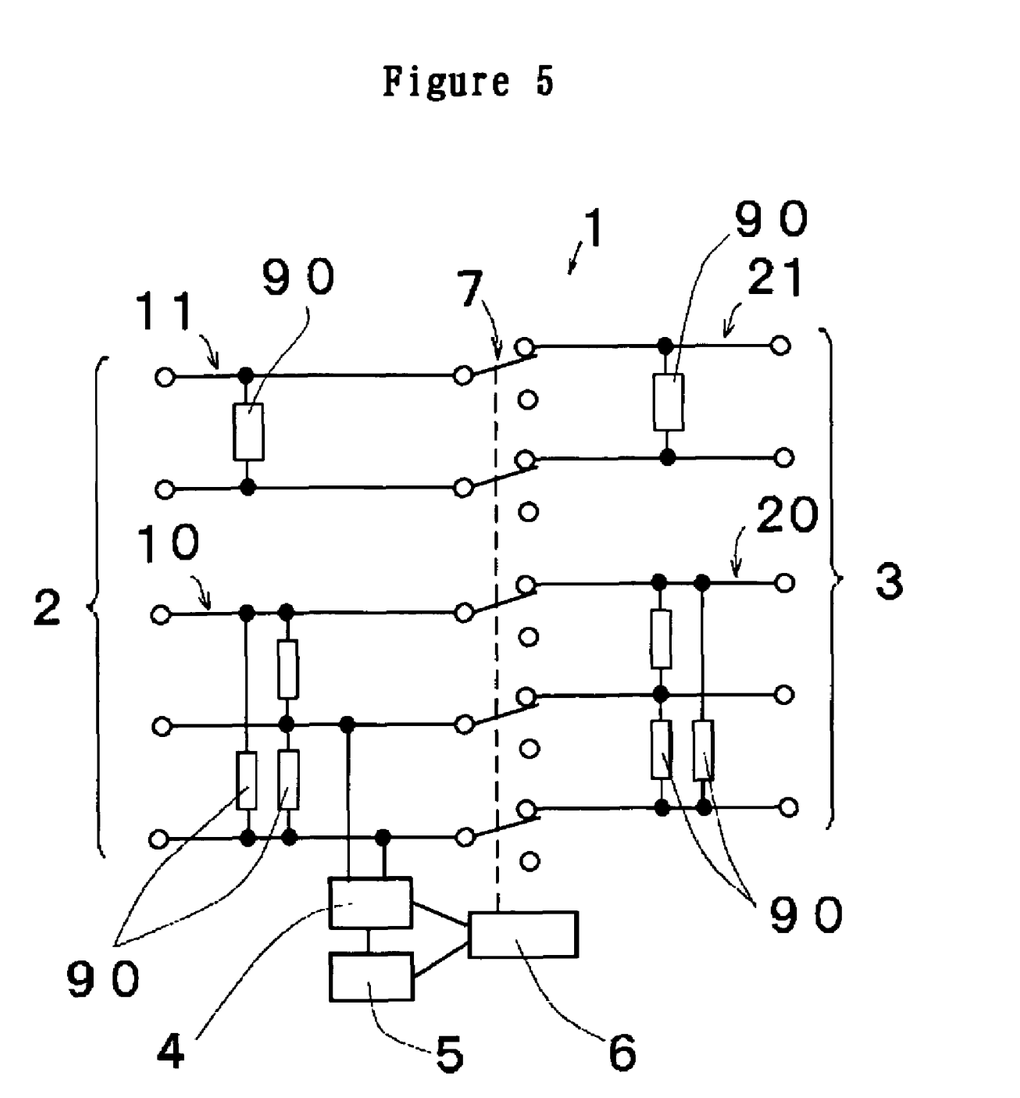
FIG. 5 is an explanatory diagram showing the third embodiment of the present invention.

In case of a device such as a personal computer, connected to both an electric path and communication line, by providing both the electric paths 10, 20 and the communication lines 11, 21 as shown in FIG. 5 with the status change-over switch 7, the protection object device can be protected. In the meantime, like reference numerals are attached to the same components as FIG. 1 and description thereof is omitted.

(2) Operation of the Thunderbolt Disaster Protecting Apparatus

[1] Normal Condition

In the normal condition in which no thunderbolt approaches, the status change-over switch 7 is changed over to the bypass line 8 side so that the thunderbolt resisting transformer 30 is separated thereby producing a state in which no power is supplied. Thus, no electricity loss is generated in the thunderbolt resisting transformer 30.

Further, detection of the arrival of the thunderbolt by means of the thunderbolt attack detecting circuit 5 is continued.

[2] Thunderbolt Resisting Status

When the thunderbolt arrives, lightning surge is detected by the thunderbolt attack detecting circuit 5 and the status change-over switch 7 is changed over to the side of the thunderbolt resisting transformer 30. Consequently, a load is connected to the electric path 10 through the thunderbolt resisting transformer 30 thereby protecting from lightning surge.

Further, when a predetermined time elapses after a last lightning surge is detected, it returns to normal condition.

[3] Power Interruption and Power Interruption Restoration Condition

If power interruption occurs due to a reason, for example, falling of thunderbolt so that electric power necessary for operating the thunderbolt disaster protecting apparatus cannot be obtained, the status change-over switch 7 is kept in a status before the power interruption. Consequently, even if power interruption occurs in the thunderbolt resisting condition, the load can be kept in such a condition in which it is connected to the electric path 10 through the thunderbolt resisting transformer 30 and even if lightning surge occurs after the power interruption, it can be protected.

When the status is restored from the power interruption, the thunderbolt attack detecting circuit 5 detects the presence or the absence of lightning surge and if it is not detected, the status change-over switch 7 is changed over to the normal condition and if it is detected, to the thunderbolt resisting condition. In the meantime, any given condition is maintained.

3. THIRD EMBODIMENT

In FIG. 5, a thunderbolt resisting transformer 30 can be inserted in between the electric path 10 and the load side electric path 20 when the thunderbolt resisting condition arises, as shown in FIG. 3. Alternatively, it is possible to provide only a communication line 11, 21 with the status change-over switch 7 so as to change over between the normal condition and the thunderbolt resisting condition Next, the operation of a case where the electric path 10 is interrupted by falling of thunderbolt or the like will be described. Due to the power interruption, supply of electricity of the thunderbolt disaster protecting apparatus 1 to the power supply circuit 4 is eliminated, stopping the operation of the thunderbolt attack detecting circuit 5. In the meantime, because the status change-over switch 7 is mechanically maintained, the normal condition just before power interruption and the thunderbolt resisting condition can be maintained during power interruption also.

If an electromagnetic contact device such as a relay which is restored without voltage as the status change-over switch 7 is used, by memorizing a status just before power interruption into the operation control means 6 using an electric means such as a memory or a mechanical means such as a keep relay, the status just before power interruption can be restored easily just after the power is restored.

By memorizing the status just before the power interruption in the operation control means 6, the status change-over switch 7 on operation can be operated securely up to a normal position during restoration of the power supply.

Then, the thunderbolt attack detecting circuit 5 detects the presence or the absence of approaching thunderbolt in a predetermined time interval after the power is restored. The thunderbolt attack detecting circuit 5 instructs the operation control means 6 to turn the status change-over switch 7, if the thunderbolt is detected once or more in the predetermined time interval, to be in the thunderbolt resisting condition and if no approaching thunderbolt is detected, to be in the normal condition. In the meantime, the aforementioned predetermined time can be set to arbitrary time between several seconds and several tens minutes.

In this way, the thunderbolt attack detecting circuit 5 detects the presence or the absence of approaching thunderbolt in a predetermined time after the power is restored and based on that result, turns the status change-over switch 7. Consequently, the thunderbolt attack detecting circuit 5 turns into initial condition due to power interruption, so that sending of a change-over signal to the operation control means 6 so as to obtain the normal condition by determining that no thunderbolt approaches can be eliminated. Alternatively, if power interruption occurs in the thunderbolt resisting condition and any thunderbolt does not approach after the power is restored, the thunderbolt attack detecting circuit 5 turns into the initial condition due to power interruption, so that it is determined that no thunderbolt is approaching and then, any signal is not sent to the operation control means 6 thereby preventing the thunderbolt resisting condition from being maintained. Further, whether or not the thunderbolt is approaching just after the power is restored can be recognized thereby blocking misjudgment.

If any backup power supply for securing the operation during power interruption is not provided, the thunderbolt attack detecting circuit 5 turns into initial condition due to power interruption when thunderbolt approach is continued and the thunderbolt attack detecting circuit 5 determines that no thunderbolt is approaching, thereby preventing the status from being changed over to the normal condition. As a result, the protection object device can be protected from a thunderbolt. Alternatively, by maintaining the thunderbolt resisting condition, the status in which supply of electricity to the protection object device is stopped can be eliminated.

If the thunderbolt resisting transformer 30 is used, it is permissible to turn the circuit into the thunderbolt resisting condition once when the power is being restored, and as a result, it is possible to suppress generation of any lightning disaster just after the power is restored.

In the meantime, the present invention is not limited to the above-described embodiments and may be modified in various ways within a scope of the present invention depending on purpose and application.

For example, a thunderbolt attack detecting means for detecting a thunderbolt attack as a result of at least one of lightning, thunder, lightning surge, electromagnetic wave and electric field and the switching mechanism can, after a forerunning phenomenon of thunderbolt is not detected or the thunderbolt attack is detected by the thunderbolt attack detecting means, change over its switching mechanism switch to the normal condition temporarily. Even if any thunderbolt attack occurs, by maintaining the thunderbolt resisting condition only during a thunderbolt attack period, the thunderbolt resisting transformer can protect it even if plural thunderbolt attacks (multiple thunderbolts) happen in a single falling of thunderbolt.

The switching mechanism can be changed over to the normal condition after a predetermined forerunning period calculated since the aforementioned forerunning phenomenon is detected and a predetermined lightning period calculated since the thunderbolt attack phenomenon is detected both elapse. Consequently, since the forerunning phenomenon is out of detection, the status returns to the normal condition after the forerunning period elapses and as a result, the device can be protected only in a period in which the thunderbolt may be generated.

There are further provided a manual operation switch and a manual operation instructing means and the manual operation instructing means instructs manual operation or manual operation release to the thunderbolt attack detecting circuit depending on the operation of the manual operation switch. If the manual operation is instructed, the thunderbolt attack detecting circuit changes over the switching mechanism to the thunderbolt resisting condition and if the manual operation release is instructed, changes over the switching mechanism to the normal condition.

When the switching mechanism is changed over to the thunderbolt resisting condition, the thunderbolt attack detecting circuit can be inhibited from an operation of changing over to the normal condition even if the manual operation release instruction is received, until a predetermined thunderbolt resisting period elapses since when the switching mechanism is changed over to the thunderbolt resisting condition and/or when the forerunning phenomenon is detected.

By providing the manual operation switch and the manual operation instructing means, the thunderbolt resisting condition can be set up manually, so that protection from lightning surge can be carried out securely. Further, by disabling manual release of the thunderbolt resisting condition in a period in which the thunderbolt resisting condition is maintained, a disaster due to erroneous operation can be prevented.

A detection line of lightning surge signal used in the thunderbolt attack detecting circuit can be connected to the shield and iron core of the thunderbolt resisting transformer. The shield and iron core of the thunderbolt resisting transformer are often grounded and by obtaining a lightning surge signal from this grounding line, stray capacitance of the thunderbolt resisting transformer is used and this is used as a substitute of a coupling capacitor for detection. Thus, any expensive coupling capacitor having a specially high voltage withstanding capacity does not need to be used and therefore, this can be produced at cheap cost. Further, because the necessity of the coupling capacitor diminishes at the same time, the thunderbolt resisting transformer is allowed to be of the same size as a conventional one, so that the apparatus can be reduced in size.

Further, there are further provided a first determining means which detects a lightning surge signal with the thunderbolt attack detecting circuit, compares the detection signal of a detected lightning surge with a predetermined judgment value and if the judgment value is over a predetermined first level value and the lightning surges over a predetermined number occur in a predetermined time, determines that the thunderbolt is approaching and a second determining means in which the judgment value is set at a predetermined second level value higher than the first level value and if lightning surge over the second level occurs, determines that the thunderbolt is approaching and if any one of the first determining circuit and the second determining circuit determines that the thunderbolt is approaching, that the thunderbolt is approaching can be determined.

By using the first determining means, it is possible to determine that the thunderbolt, which approaches from far away gradually, is approaching without any erroneous judgment and by using the second determining means, it is possible to immediately determine that any thunder cloud developed nearby rapidly approaches. Thus, the protection object device can be protected from thunderbolt disaster securely.

The invention claimed is:

1. A thunderbolt disaster protecting apparatus comprising:
    a thunderbolt resisting transformer;
    a thunderbolt attack detecting circuit for determining whether or not any thunderbolt is approaching by detecting a thunderbolt signal; and
    a switching mechanism for changing over to the normal condition in which a protection object device is connected to an electric path or to the thunderbolt resisting condition in which said protection object device is connected to the electric path through said thunderbolt resisting transformer, wherein
    said thunderbolt attack detecting circuit and said switching mechanism obtain a control power supply from said electric path and said thunderbolt attack detecting circuit changes over said switching mechanism to said normal condition at the time of normal condition and when any thunderbolt is approaching, changes over said switching mechanism to said thunderbolt resisting condition, and wherein when said switching mechanism is in said normal condition, said thunderbolt resisting transformer is disconnected from said electric path to eliminate power consumption by said thunderbolt resisting transformer.

2. The thunderbolt disaster protecting apparatus according to claim 1, wherein said thunderbolt attack detecting circuit further comprises a power interruption restoration circuit which after said control power supply is interrupted and then the power interruption is restored, determines whether or not any thunderbolt is approaching in a predetermined time interval and changes over said switching mechanism to said thunderbolt resisting condition if a thunderbolt is approaching and to said normal condition if the condition is normal.

3. The thunderbolt disaster protecting apparatus according to claim 1, wherein when a lightning surge occurs after said power interruption, said protection object device remains protected.

* * * * *